United States Patent [19]

Rogers

[11] Patent Number: 4,907,516
[45] Date of Patent: Mar. 13, 1990

[54] PULSED INJECTION INTO THE GROUND OF LIQUID FERTILIZER

[76] Inventor: Ramon B. Rogers, 1510 Hilliard Street, E. Saskatoon, Saskatchewan, Canada, S7J 0G4

[21] Appl. No.: 208,216

[22] Filed: Jun. 17, 1988

[51] Int. Cl.⁴ ............... A01C 23/02; B05B 1/08; F16K 31/06
[52] U.S. Cl. ............... 111/127; 111/135; 239/99; 251/129.16
[58] Field of Search ............ 111/6, 7, 118, 119, 111/127; 47/1.7; 251/129.15, 129.16; 239/99, 101; 51/27, 28, 438, 436

[56] References Cited

U.S. PATENT DOCUMENTS

| | | | |
|---|---|---|---|
| Re. 25,307 | 12/1962 | Johnston | 111/127 |
| 1,754,740 | 4/1930 | Clarkson | 251/129.16 |
| 3,012,526 | 12/1961 | Baldwin et al. | 111/6 |
| 3,435,785 | 4/1969 | Hurbolt | 111/6 |
| 3,521,819 | 7/1970 | Johnston | 111/6 |
| 3,736,890 | 6/1973 | Barnes | 111/118 |
| 3,986,672 | 10/1976 | Smith et al. | 251/321 |
| 4,182,247 | 1/1980 | Talbott | 111/7 |

Primary Examiner—Danton D. DeMille
Attorney, Agent, or Firm—Adrian D. Battison; Stanley G. Ade; Murray E. Thrift

[57] ABSTRACT

Fertilizer or other liquid crop treatment is applied to the ground using a direct injection jet with a nozzle position closely adjacent the ground and forming a jet of the liquid directed into the ground. A solenoid controlled valve cyclically halts the flow of fluid to form short pulses of the fluid so that the fluid can be supplied in concentrate form while generating sufficient energy to achieve a depth of penetration in the range 2 to 4 inches. The solenoid controlled valve and nozzle is mounted on a skid member carried on a depth control wheel. The period of the pulses is arranged so that the length of a pulse is very short relative to the spacing between the pulses with the spacing between adjacent rows formed by adjacent heads being substantially equal to the spacing between the individual pulses.

7 Claims, 2 Drawing Sheets

PULSED INJECTION INTO THE GROUND OF LIQUID FERTILIZER

BACKGROUND OF THE INVENTION

This invention relates to a technique for direct injection into the ground of a liquid fertilizer or other crop treatment.

In the past fertilizer has been applied to the ground using several methods. Perhaps the initial method was that of broadcasting in which the fertilizer is spread upon the surface of the soil. Various developments have been made in the equipment used for the broadcasting technique to improve the consistency of the spread pattern and still this technique remains the most widely used. The technique does however in most cases require incorporation of the fertilizer into the soil by tillage to minimize volatization and to improve the placement of the fertilizer so that it can be more readily accepted by the crop.

In recent years deep banding has received much experimentation and has achieved some commercial acceptance. In deep banding the fertilizer is placed into the ground generally at a position below the seed in the root zone by drawing a knife or other piece of tillage equipment through the soil while the fertilizer is placed into the ground in the furrow formed by the knife. In some cases the deep banding is carried out at the same time as the seeding with the level of the seed and the fertilizer being controlled to achieve the proper relative locations for best use of the fertilizer by the seed.

Both of these techniques therefore require a tillage operation to place the fertilizer properly into the soil at the required level relative to the root zone. Tillage operations of course have high draft requirements and the soil is disturbed creating a loose seed bed and opening the soil for moisture loss and erosion.

In recent years much attention has been given in research to reducing tillage operations particularly since its importance in soil conservation has been appreciated.

It has been accepted therefore that a technique would be highly desirable for injecting fertilizer or other crop treatment material directly into the ground so as to avoid the necessity for tillage and to provide a number of further advantages discussed hereinafter.

A number of researchers have therefore undertaken projects to attempt to develop a device in which a nozzle is arranged adjacent the ground and the fertilizer or other liquid is passed at high pressure through an orifice in the nozzle to form a jet of the liquid which is directed vertically downwardly into the ground. This research has reached the conclusion that for effective fertilizer placement, it must reach a depth in the range 2 inches to 4 inches from the upper surface of the ground. In order to achieve this depth, a high level of energy is necessary in the jet as it emerges from the nozzle and thus very high pressures are necessary to very high velocity approaching the speed of sound together with a relatively high level of fluid flow.

While the considerable advantages of this technique have been appreciated, the researchers have failed to achieve a commercial operation and it is believed at the present time that the technique has been abandoned and no commercial machine is currently available on the market.

SUMMARY OF THE INVENTION

It is one object of the present invention, therefore, to provide an improved method for directly injecting liquid fertilizer or the like into the ground in a manner which enables the fertilizer to be placed at a required depth and at locations which it can be properly utilized by the plant root structure.

According to the invention, therefore, there is provided a method of applying a crop treatment liquid into the ground for accessibility by a crop on the ground, the method comprising supplying the liquid in a container, transporting the container across the ground, pumping liquid from the container to an injection nozzle under high pressure, mounting the nozzle for movement across the ground at a substantially constant height closely adjacent the ground with the nozzle arranged in a direction to inject the liquid downwardly into the ground, passing the liquid through an orifice in the nozzle to generate a high velocity solid steam jet of the liquid such that the liquid is driven into the ground to a depth below the surface of the ground, and controlling the flow of liquid from the pump to the nozzle such that the liquid flow is cyclically halted and restarted to generate spaced pulses of the liquid.

The present invention is therefore based upon the appreciation by the inventor that sufficient energy in the jet of liquid can be obtained to achieve the required depth only by injection of a relatively large quantity of the liquid, with that large quantity being limited to short bursts or pulses over the extent of movement of the nozzle over the ground.

The short pulses allow the use of a minimum amount of liquid and hence the liquid can be used in concentrate form without the necessity of applying to the ground large quantities of carrier liquid generally water.

In the previous attempts to design a device of this type, the concentration of the researchers was in attempting to achieve the required amount of energy while minimizing the amount of liquid by reducing orifice size and pressure down to a minimum. This approach has been unsuccessful as evidenced by the abandonment of the approach and it is only by the realization that the liquid can be placed in nests by way of the pulsed effect which enables a successful use of this technique to be achieved.

The present invention thus has the following advantages:

1. No soil disturbance
   soil degradation is reduced with less tillage
   increased soil and moisture conservation
   minimal power requirement - approximately 1 HP per foot of machine
   can apply fertilizer and micronutrients as required even after the crop is up especially important for winter wheat, forage crops and intensive crop management practice
   less compaction - smaller equipment and power unit
   no problem with trash clearance or fertilizer depositing on trash
   less weed growth because seeds are not buried
2. More Efficient Fertilizer Utilization
   less fertilizer losses because fertilization is applied when it is required - not weeks or months before
   fertilizer is placed directly in root zone where it is directly taken up by plant - as opposed to broadcasting or top dressing which can lose 60% through volatilization no diluent is required the plant growth can be modified by timed feeding 3. Economic Benefits increased return on the investment on fertilizer reduced input fuel consumption and operational costs save approximately $3.50/acre in fuel - approximately a 50% saving more cost effective use of fertilizer - fertilizer is applied as and when needed the farmer can apply additional fertilizer in late June or early July in years when market and moisture conditions warrant the additional investment increased profits from increased yields custom applicators can greatly increase acreage covered by a machine because of the extended application season it makes Intensive Crop Management technology feasible for dryland agriculture With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS:

In the drawings like characters of reference indicate corresponding parts in the different figures.

DETAILED DESCRIPTION

Figure 1:
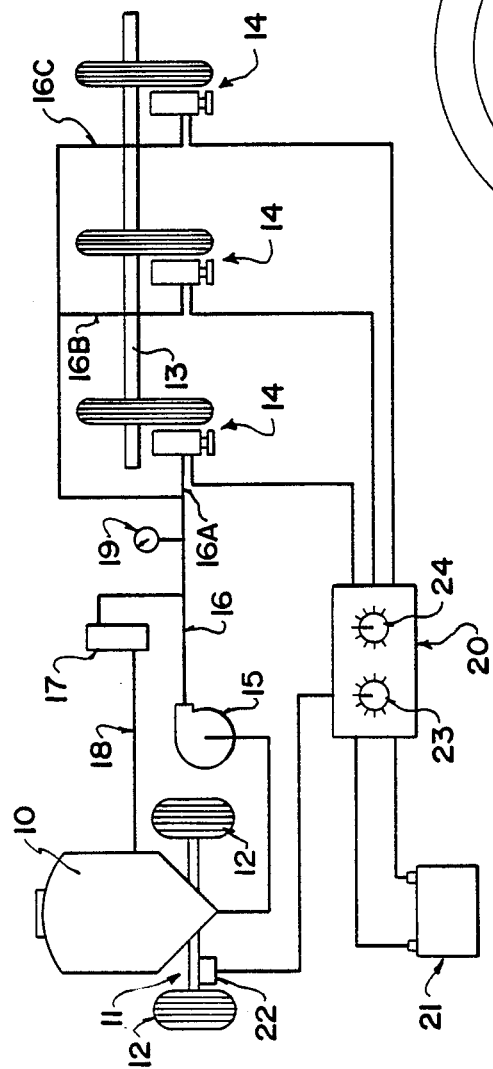
FIG. 1 is a schematic illustration of an apparatus for applying a crop treatment liquid into the ground.

The apparatus as shown schematically in FIG. 1 includes a supply tank 10 mounted upon a suitable vehicle indicated schematically at 11 including ground wheels 12 by which the tank can be transported across the ground so the apparatus can apply a treatment liquid to the ground. Mounted upon the rear of the vehicle and shown separately for convenience of illustration is a tool bar 13 upon which is mounted a plurality of injector heads each generally indicated at 14. Each injector head is shown in more detail in FIGS. 2 and 3 and will be described in more detail hereinafter.

Liquid drawn from a lower discharge point on the tank 10 is transmitted to a pump 15 arranged to generate a high pressure of the order of 6000 PSI in a liquid forwarded from the pump along a line 16. The pump is of a conventional type commercially available and accordingly will not be described in detail. The high pressure liquid on the line 16 passes to a pressure regulator 17 which maintains the pressure on the line 16 with any excess liquid being returned along the line 18 to the tank so that the pressure on the line at the point 16 is maintained at the required value regardless of the amount of liquid drawn from the line 16 to the heads 14. An indicator is mounted in line 16 as shown at 19.

The line 16 divides into separate lines 16A, 16B and 16C for supplying the fluid under a constant common pressure to the heads 14.

A control device indicated at 20 acts to control the injection heads as will be described in more detail hereinafter. The control unit 20 receives power from a battery 21 and receives signals from a speed detector 22 coupled at a suitable location on the vehicle. Two manually actuable dials are provided on the control unit 20 one of which is indicated at 23 and acts to control the pulse length as will be described hereinafter and another of which is indicated at 24 and acts to control the spacing between the pulses as described hereinafter.

Each of the injector heads mounted on the tool bar 13 comprises a trailing linkage 25 which connects to the hub 26 of a ground wheel 27. The ground wheel 27 is thus free to raise and fall relative to the tool bar 13 in dependence upon ground height to maintain the hub or axle 26 at a set distance from the ground. The ground wheel 27 is of the type including a rubber tire while having a rather large diameter to more accurately control the height of the hub 26.

A bracket 28 is mounted on the linkage 25 and carries a vertical shaft 29 both of which are thus supported by the hub and maintained at a constant distance from the ground. The bottom end of the shaft 29 is welded to a skid plate 30 which extends forwardly therefrom lying in the plane of the grounds surface that is in the tangential plane to the lower most edge of the wheel 27. The skid 30 includes an upwardly turned front end 31 to allow the skid to lift over small obstacles for example stones and soil clumps which are sufficiently small to avoid the general lifting action provided by the wheel 27. The whole unit is self weighted so that both the wheel and the skid plate rest upon the ground with the undersurface of the skid plate is maintained accurately in contact with the ground without generating a furrow in the ground.

Figure 2:
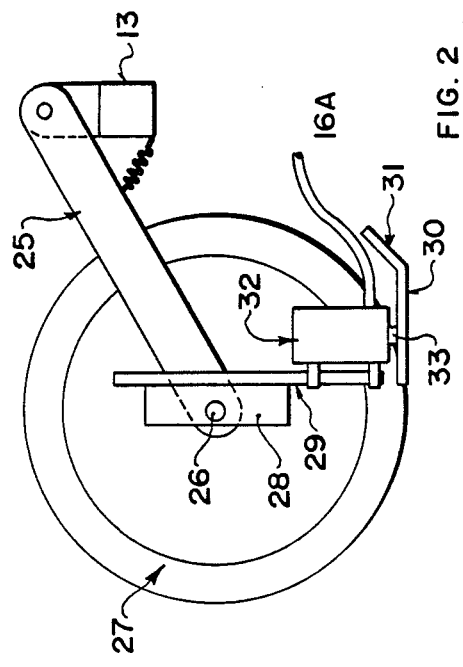
FIG. 2 is a side elevational view of one of the injecting heads of FIG. 1.

Attached to the vertical shaft 29 is an injector nozzle and solenoid control valve schematically indicated in FIG. 2 at 32. The unit includes a nozzle indicated at 33 which projects downwardly through an opening in the plate 30 indicated at 34.

Figure 3:
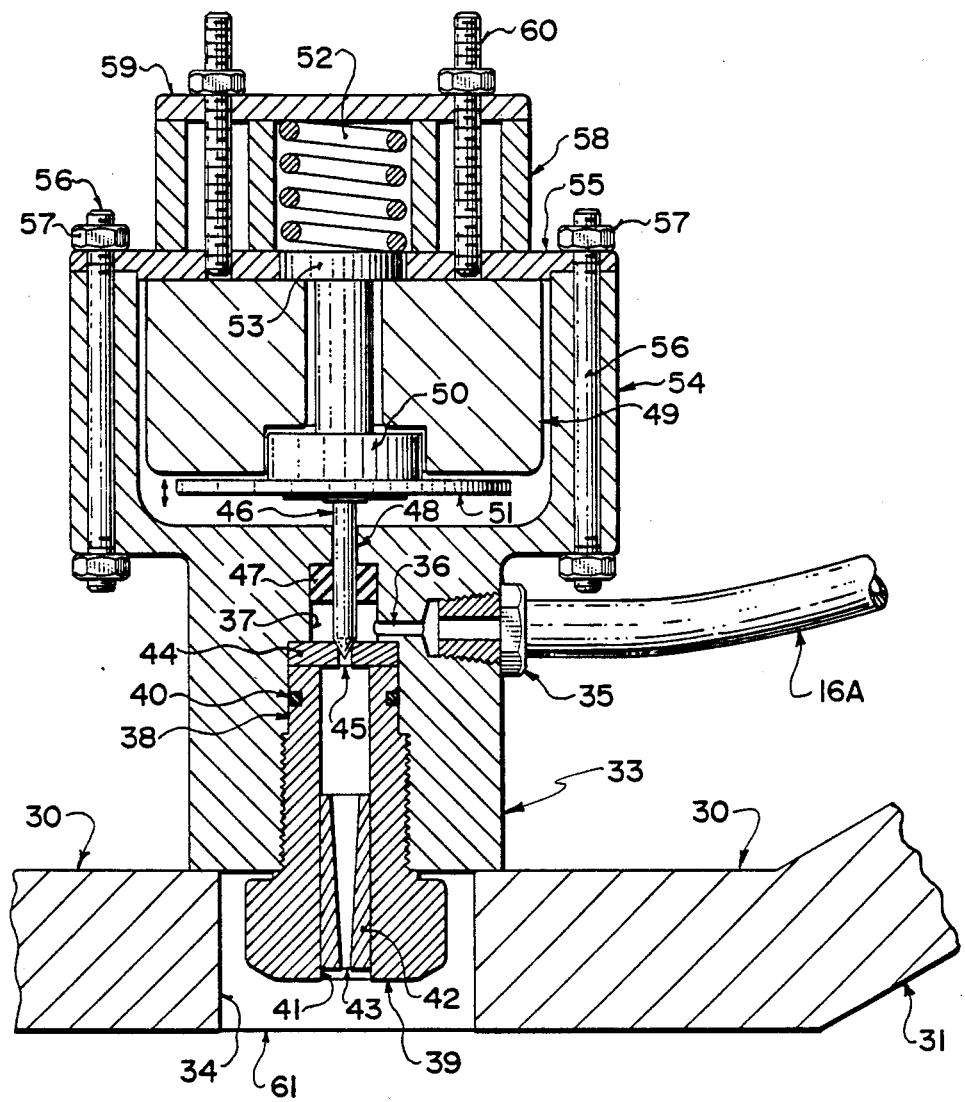
FIG. 3 is a cross sectional view of the injecting nozzle and control valve of the apparatus of FIGS. 1 and 2.

Turning therefore to FIG. 3, the liquid supply line 16A communicates with a side of the nozzle body 33 through a threaded cap 35 which connects into suitable opening in the body 33. The supplied liquid passes through a short bore 36 into a central bore 37 within the body 33. The body is counterbored to define a wider section indicated at 38 for receiving a nozzle tip 39 having external screw thread for cooperating with an internal screw thread within the counter bore 38. A parker O-ring 40 is provided on the outer surface of the nozzle tip 39 forming a seal between the counterbore 38 and the nozzle tip to accommodate the high pressure fluid injected from the line 16A. Within an inner bore 41 of the nozzle tip is provided an insert 42 of a suitable hardened material for example tungsten carbide or aluminum oxide which is resistant to the high pressure corrosive materials forming the liquid to be injected into the ground. A lower most edge 43 of the insert 42 defines an orifice which is sized, as discussed hereinafter, to generate a jet of the liquid having a velocity and volume dependant upon the size of the orifice and the pressure of the liquid.

At the end of the counterbore 38 above the nozzle body 39 is trapped a valve plate 44 which has a small central orifice 45 cooperating with a needle valve 46.

The needle valve 46 passes through a seal 47 in the base of the bore 37 and through an opening 48 at the upper edge of the body 33. The needle valve 46 is actuated by a solenoid 49 of a conventional high-speed type which includes an armature 50 including a plate 51 mounted on the needle valve 46. The needle valve is biased in a downward direction by a spring 52 operating upon a plate 53 at an upper end of the armature 50. The solenoid 49 is housed within a bore of a solenoid housing generally indicated at 54 an upper end of which is closed by a plate 55 clamped by bolts 56 and cooperating nuts 57. The spring 52 is mounted within a spring housing 58 closed by an end plate 59 and clamped by bolts 60.

In operation, movement of the vehicle across the ground is detected by the speed sensor 22 and is communicated to the control unit 20. In dependence upon the manual setting of the controls 23 and 24, the control unit 20 generates pulses to the solenoids 49 so that the needle valves 46 are drawn away from the valve plates 44 so that each of the injection heads generates a pulse of liquid which is allowed to pass from the respective line 16A, 16B, 16C into the nozzle body 39 and through the orifice 43.

The thickness of the skid plate 30 is arranged relative to the position of the orifice 43 that the surface of the ground indicated at 61 is approximately ¼ inch from the orifice 43. This spacing has been found to be the minimum practical spacing which can be achieved and is a spacing which avoids the induction into the jet flow of surrounding air. Any such induction will tend to spread the liquid flow and thus increase the opening which must be generated in the soil by the movement of the liquid thus requiring a greater amount of energy to generate the opening. It is therefore necessary to maintain the orifice 43 at the required spacing from the ground, as far as possible within practical variations of soil level in order to minimize the amount of energy necessary to generate the opening through which the fluid jet passes into the ground.

The size of the orifice is greater than and preferably in the range 0.015 inches to 0.050 inches. In order to generate sufficient energy for the liquid to reach a required depth of 2 to 4 inches it is necessary that the liquid jet carries sufficient energy to cut into the soil to that depth. In this case the size of the orifice must be greater than the above mentioned minimum in order to achieve that sufficient energy. It has been found that the depth of 2 to 4 inches can best be achieved by the orifice range stated above. An achieved depth of less than 2 to 4 inches is generally unacceptable since the fertilizer material is not placed in the required location for acceptability by the root structure of the plants.

The spacing of each head from the next adjacent head is arranged to lie in the range 4 to 30 inches. The pulses in the jet flow are arranged to be very short relative to the spaces therebetween so as to generate fertilizer nests along the rows which are spaced in the range 4 to 30 inches. In order to achieve these spacings, the valve must operate in cycles of 10 to 30 cycles per second with valve openings for less than 5.7 milliseconds with periods between the openings being approximately 40 milliseconds. In order to achieve this, the opening of the valve must take place in less than 2 milliseconds.

The use of the orifice size as defined above together with the pulse length cuts a slot shaped opening into the ground to a depth of the order of 2 to 4 inches with the liquid material injected remaining in a nest at the bottom of the cut slot. Thus the arrangement of the spacing of the rows and pulses provides a pattern or grid of nests spaced across the ground which can be accessed by the root system of the plants.

The injection of the material in pulses enables the generation of sufficient energy within those pulses to cause a liquid to reach the required depths. The fact that the material is supplied in pulses enables the actual amount of liquid to be reduced to a level such that a fertilizer material can be supplied in concentrate form without the necessity for water. The supply of water at levels previously necessary to achieve the required depths rendered the process unacceptable in view of the transportation requirements to carry the water across the ground and in addition the requirement for the actual water supply.

For the first time therefore, the present inventor has generated an arrangement in which liquid can be injected directly into the ground obtaining the advantages set down hereinbefore while applying that liquid to the ground in a manner which enables the process to be commercially viable.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What is claimed:

1. A method of applying a crop treatment liquid into the ground for accessibility by a crop on the ground, the method comprising supplying the liquid in a container, transporting the container across the ground, pumping liquid from the container to an injection nozzle under a constant high pressure of the order of 6,000 psi, mounting the nozzle for movement across the ground at a substantially constant height closely adjacent the ground with the nozzle arranged in a direction to inject the liquid downwardly into the ground, passing the liquid through an orifice in the nozzle having a transverse dimension in the range 0.015 to 0.050 inches to generate a high velocity solid stream jet of the liquid such that the liquid is driven into the ground to a depth below the surface of the ground, providing a valve having a valve orifice and a valve closure member between the pump and the nozzle orifice at a position closely adjacent the nozzle orifice, supplying the constant pressure liquid to the valve, operating the valve closure member in timed sequence such that the valve orifice is opened in repeated cycles for a time less than 0.0057 seconds and is closed between each opening and the next for a time greater than the time it is opened such that the liquid flow is cyclically halted and restarted to generate spaced pulses of the liquid and passing the pulses from the valve directly to the orifice.

2. The invention according to claim 1 wherein the liquid is injected by a plurality of nozzles spaced transversely of the direction of movement of the nozzles across the ground.

3. The invention according to claim 1 wherein the nozzle is supported upon a ground engaging wheel with the wheel rolling across the ground and arranged to support the nozzle relative to the ground at a height of the order of 0.25 inches therefrom.

4. Apparatus for applying a crop treatment liquid into the ground for accessibility by a crop on the ground, the apparatus comprising a container for a liquid to be applied, vehicle means for transporting the container across the ground, a pump for extracting liquid from the container and for generating a constant pressure of the order of 6,000 psi flow of the liquid, and injection nozzle having an orifice with a transverse dimension in the range 0.015 to 0.050 inches for generating a jet of the pumped liquid, means mounting the nozzle for movement along the ground at a substantially constant height closely adjacent the ground, said nozzle being mounted on said mounting means with the orifice facing downwardly for generating the jet of liquid in a direction downwardly onto the ground to inject the liquid into the ground, valve means having a valve orifice and a valve closure member between the pump and the nozzle orifice at a position closely adjacent the nozzle orifice, means communicating said constant pressure flow from the pump to the valve means for supplying the flow from the valve directly to the nozzle orifice, and control means for activating said valve closure member in timed sequence for periodically halting the flow of liquid from the pump to the nozzle wherein the nozzle is supported upon a ground engaging wheel with the wheel rolling across the ground and arranged to support the nozzle relative to the ground at a height of the order of 0.25 inches therefrom, and including pivotal link means mounted on an axle of the wheel and connecting the axis to a tool bar for free pivotal movement of the wheel about the tool bar, bracket means mounted on the axle, the bracket means carrying a skid member for engaging the ground at a lower most point of the wheel, the nozzle being mounted on the skid member such that the nozzle is spaced from the ground by a constant small distance.

5. The invention according to claim 4 including a plurality of nozzles spaced transversely of the direction of movement of the nozzles across the ground each nozzle including a respective one of a plurality of valve means.

6. The invention according to claim 5 wherein said mounting means is arranged such that the nozzles move continuously across the ground and wherein said timing means is arranged such that the length of the stroke on the ground of injected liquid is very much less than the spacing between the strokes.

7. The invention according to claim 4 wherein the valve includes a needle valve moveable in a direction parallel to the direction of the jet, the needle valve being operated by a solenoid and including spring means biasing the needle valve into a closed position, the nozzle including an insert of a hardened material defining the orifice.

* * * * *